(12) United States Patent
Malayath et al.

(10) Patent No.: US 7,817,717 B2
(45) Date of Patent: Oct. 19, 2010

(54) MOTION ESTIMATION TECHNIQUES FOR VIDEO ENCODING

(75) Inventors: Naren Malayath, San Diego, CA (US); Chienchung Chang, Rancho Santa Fe, CA (US); Suhail Jalil, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1525 days.

(21) Appl. No.: 10/176,028

(22) Filed: Jun. 18, 2002

(65) Prior Publication Data

US 2003/0231712 A1 Dec. 18, 2003

(51) Int. Cl.
*H04N 7/18* (2006.01)
(52) U.S. Cl. .............................. 375/240.16; 375/240.17; 375/240.26
(58) Field of Classification Search ................................. 375/240.01–240.29; 348/699
See application file for complete search history.

(56) References Cited

U.S. PATENT DOCUMENTS

| | | | | |
|---|---|---|---|---|
| 4,873,573 A | * | 10/1989 | Thomas et al. .......... | 375/240.16 |
| 4,942,466 A | | 7/1990 | Sandbank et al. | |
| 4,965,667 A | | 10/1990 | Trew et al. | |
| 4,979,041 A | | 12/1990 | Schreiber | |
| 5,021,882 A | | 6/1991 | Schreiber | |
| 5,508,744 A | * | 4/1996 | Savatier .................. | 375/240.16 |
| 5,552,831 A | | 9/1996 | Machida et al. | |
| 5,552,832 A | | 9/1996 | Astle | |
| 5,594,504 A | | 1/1997 | Ebrahimi | |
| 5,612,743 A | * | 3/1997 | Lee ........................ | 375/240.16 |
| 5,619,281 A | * | 4/1997 | Jung ........................... | 348/699 |
| 5,635,986 A | * | 6/1997 | Kim ........................ | 375/240.16 |
| 5,870,500 A | | 2/1999 | Daoudi et al. | |
| 6,020,925 A | * | 2/2000 | Jung ...................... | 375/240.16 |
| 6,137,837 A | | 10/2000 | Nemiroff et al. | |
| 6,195,389 B1 | | 2/2001 | Rodriguez et al. | |
| 6,212,237 B1 | | 4/2001 | Minami et al. | |

(Continued)

FOREIGN PATENT DOCUMENTS

EP 1051040 A1 11/2000

(Continued)

OTHER PUBLICATIONS

Luo L. et al: "A New Prediction Search Algorithm For Block Motion Estimation In Video Coding", IEEE Transactions On Consumer Electronics, IEEE Inc., New York, US, vol. 43, No. 1, Feb. 1, 1997, pp. 56-61.

(Continued)

*Primary Examiner*—Andy S Rao

(57) ABSTRACT

Video encoding techniques are described. In one example, a video encoding technique includes identifying a pixel location associated with a video block in a search space based on motion vectors associated with a set of video blocks within a video frame to be encoded, wherein the video blocks in the set are spatially located at defined locations relative to a current video block of the video frame to be encoded. A motion estimation routine can then be initialized for the current video block at the identified pixel location. By identifying a pixel location associated with a video block in a search space based on motion vectors associated with a set of video blocks within a video frame, the phenomenon of spatial redundancy can be more readily exploited to accelerate and improve the encoding process.

49 Claims, 12 Drawing Sheets

U.S. PATENT DOCUMENTS

| | | | |
|---|---|---|---|
| 6,222,883 | B1 | 4/2001 | Murdock et al. |
| 6,332,041 | B1 | 12/2001 | Yoshida |
| 6,430,223 | B1 * | 8/2002 | Lim .................. 375/240.16 |
| 6,594,314 | B1 * | 7/2003 | Ando .................. 375/240.16 |
| 2001/0028681 | A1 | 10/2001 | Choi |
| 2002/0012396 | A1 | 1/2002 | Pau et al. |
| 2002/0025001 | A1 | 2/2002 | Ismaeil et al. |

FOREIGN PATENT DOCUMENTS

| | | |
|---|---|---|
| EP | 1152621 | 7/2001 |
| JP | 08140101 A | 5/1996 |
| JP | 08205154 A | 8/1996 |
| JP | 2000069481 A | 3/2000 |
| WO | 9638006 A1 | 11/1996 |
| WO | WO033580 A1 | 6/2000 |
| WO | 0070879 A1 | 11/2000 |
| WO | 0232145 | 4/2002 |

OTHER PUBLICATIONS

Lengwehasatit K. et al: "A Novel Computationally Scalable Algorithm For Motion Estimation", Proceedings of the Spie, Spie, Bellingham, VA, US, vol. 3309, No. 1, Jan. 28, 1998, pp. 68-79.

Kim S. D. et al: "An Efficient Motion Vector Coding Scheme Based on Minimum Bitrate Prediction", IEEE Transactions On Image Processing, IEEE Inc. New York, US, vol. 8, No. 8, Aug. 1999, pp. 1117-1120.

Yen-Kuang Chen et al: "Rate Optimization by True Motion Estimation", Multimedia Signal Processing, 1997, IEEE First Workshop On Princeton, NJ, US, Jun. 23, 1997, pp. 187-194.

Kossentini F. et al: Predictive RD Optimized Motion Estimation For Very Low Bit-Rate Coding:, IEEE Journal On Selected Areas in Communications, IEEE Inc., New York, US, vol. 15, No. 9, Dec. 1, 1997, pp. 1752-1762.

Park S. R. et al: "Reconfiguration for Power Saving in Real-Time Motion Estimation", IEEE International Conference On Acoustics, New York, US, vol. 5, Conf. 23, May 12, 1998, pp. 3037-3040.

Liu, et al., "A new predictive search algorithm used for motion estimation in MPEG2," Journal of Electronics, Sep. 1998, vol. 20, No. 5, pp. 592-595.

Written Opinion - PCT/US03/019400, IPEA/US - Alexandria, VA Aug. 17, 2003.

International Preliminary Examination Report - PCT/US03/019400, IPEA/US - Alexandria, VA Feb. 14, 2006.

International Search Report - PCT/US03/019400 - International Search Authority, European Patent Office - Dec. 22, 2003.

* cited by examiner

MACROBLOCK

SEARCH SPACE

MOTION ESTIMATION TECHNIQUES FOR VIDEO ENCODING

TECHNICAL FIELD

This disclosure relates to digital video processing and, more particularly, encoding of video sequences.

BACKGROUND

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones, and the like. These and other digital video devices can provide significant improvements over conventional analog video systems in creating, modifying, transmitting, storing, recording and playing full motion video sequences.

A number of different video encoding standards have been established for encoding digital video sequences. The Moving Picture Experts Group (MPEG), for example, has developed a number of standards including MPEG-1, MPEG-2 and MPEG-4. Other standards include ITU H.263, QuickTime™ technology developed by Apple Computer of Cupertino California, Video for Windows™ developed by Microsoft Corporation of Redmond, Wash., Indeo™ developed by Intel Corporation, RealVideo™ from RealNetworks, Inc. of Seattle, Wash., and Cinepak™ developed by SuperMac, Inc. These and other standards, including standards yet to be developed, will continue to evolve.

Many video encoding standards achieve increased transmission rates by encoding data in a compressed fashion. Compression can reduce the overall amount of data that needs to be transmitted for effective transmission of video frames. The MPEG standards, for example, utilize graphics and video compression techniques designed to facilitate video and image transmission over a narrower bandwidth than can be achieved without the compression. In particular, the MPEG standards support video encoding techniques that utilize similarities between successive video frames, referred to as temporal or inter-frame correlation, to provide inter-frame compression. The inter-frame compression techniques exploit data redundancy across frames by converting pixel-based representations of video frames to motion representations. In addition, the video encoding techniques may utilize similarities within frames, referred to as spatial or intra-frame correlation, in order to further compress the video frames. The intra-frame compression is typically based upon texture encoding processes for compressing still images, such as discrete cosine transform (DCT) encoding.

To support the compression techniques, many digital video devices include an encoder for compressing digital video sequences, and a decoder for decompressing the digital video sequences. In many cases, the encoder and decoder form an integrated encoder/decoder (CODEC) that operates on blocks of pixels within frames that define the sequence of video images. In the MPEG-4 standard, for example, the encoder of a sending device typically divides a video frame to be transmitted into macroblocks containing smaller image blocks. For each macroblock in the video frame, the encoder searches macroblocks of the immediately preceding video frame to identify the most similar macroblock, and encodes the difference between the macroblocks for transmission, along with a motion vector that indicates which macroblock from the previous frame was used for encoding. The decoder of a receiving device receives the motion vector and encoded differences, and performs motion compensation to generate video sequences.

The video encoding process is computationally intensive, particularly when motion estimation techniques are used. For example, the process of comparing a video block to be encoded to video blocks of a previously transmitted frame requires large numbers of computations. Improved encoding techniques are highly desirable, particularly for use in wireless devices or other portable video devices where computational resources are more limited and power consumption is a concern. At the same time, improved compression is desirable to reduce the bandwidth required for effective transmission of video sequences. Improving one or more of these factors may facilitate or improve real-time encoding of video sequences, particularly in wireless and other limited-bandwidth settings.

SUMMARY

This disclosure describes video encoding techniques that can be used to encode video sequences. For example, a video encoding technique may involve identifying a pixel location associated with a video block in a search space based on motion vectors of a set of video blocks within a video frame to be encoded. The video blocks in the set of video blocks may comprise video blocks located at defined locations relative to a current video block of the video frame to be encoded. A motion estimation routine can then be initialized for the current video block at the identified pixel location. By identifying a pixel location associated with a video block in the search space based on calculated motion vectors associated with a set of video blocks within a video frame, the phenomenon of spatial redundancy can be more readily exploited to accelerate and improve the encoding process. In various examples, the initialized location can be calculated using a linear or non-linear function based on motion vectors of a set of video blocks located at defined locations relative to a video block to be encoded. For example, a median function, a mean function or a weighted function based on the motion vectors of the set of video blocks can be used.

After initializing the motion estimation routine at a pixel location within a search space to encode a current video block of a video frame, the motion estimation routine can be performed to encode the current video block. In order to reduce the number of computations during encoding, the motion estimation routine may comprise a non-exhaustive search of video blocks within a search space. For example, the motion estimation routine may include defining a circle of radius (R) around the initialized pixel location, and comparing the current video block to be encoded to video blocks of the search space associated with a set of pixel locations within the circle. The circle may be large enough to include at least five pixels. However, by defining the circle to be large enough to include at least nine pixels, e.g., the center pixel and eight pixels that surround the center pixel, the process may be improved by anticipating video motion in every direction. Larger or smaller circles may also be used. The routine may further include identifying a pixel location within the circle that identifies a video block yielding a lowest difference value, and encoding the current video block using a motion vector defined by the pixel location within the circle that identifies the video block yielding the lowest difference value when that pixel location corresponds to the center of the circle.

However, if the pixel location within the circle that identifies the video block yielding the lowest difference value does not correspond to the center of the circle of radius (R), a new circle of radius (R') can be defined around the pixel location within the circle that identifies the video block yielding the lowest difference value. In that case, the routine may further include determining a pixel location within the circle of radius (R') that identifies a video block yielding a lowest difference value, and encoding the current video block using a motion vector defined by that pixel location when that pixel location corresponds to a center of the circle of radius (R'). The routine may continue in a similar fashion, defining additional circles, if necessary, until the video block yielding the lowest difference value corresponds to a center of a circle.

These and other techniques outlined in greater detail below may be implemented in a digital video device in hardware, software, firmware, or any combination thereof. If implemented in software, the techniques may be directed to a computer readable medium comprising program code, that when executed, performs one or more of the encoding techniques described herein. Additional details of various embodiments are set forth in the accompanying drawings and the description below. Other features, objects and advantages will become apparent from the description and drawings, and from the claims.

DETAILED DESCRIPTION

Figure 1:
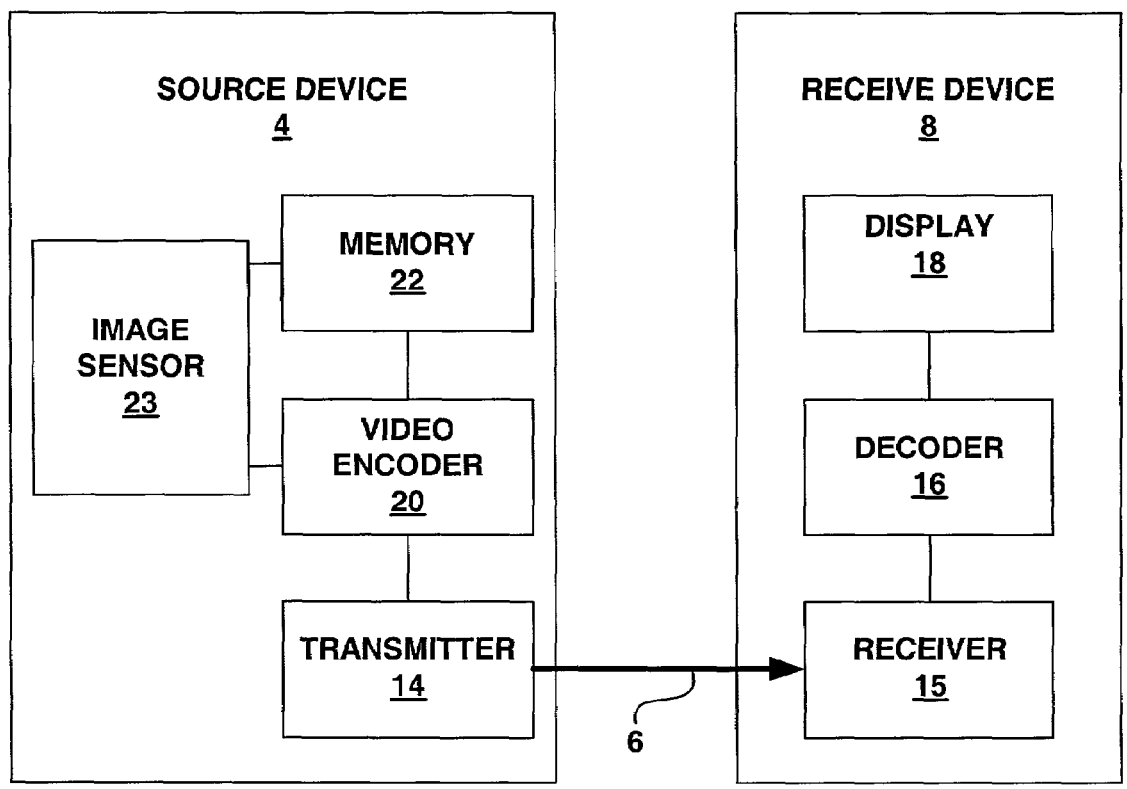
FIG. 1 is a block diagram illustrating an example system in which a source device transmits an encoded sequence of video data to a receive device.

In general, this disclosure is directed to encoding techniques that can be used to improve encoding of digital video data. The techniques can be executed by an encoder of a digital video device in order to reduce computations in certain scenarios, accelerate processing time, increase data compression, and possibly reduce power consumption during video encoding. In this manner, the encoding techniques can improve video encoding according to standards such as MPEG-4, and better facilitate the implementation of video encoding within wireless devices where computational resources are more limited and power consumption is a concern. In addition, the techniques may be configured to preserve interoperability capabilities with decoding standards such as the MPEG-4 decoding standard.

The video encoding techniques described herein may implement an initialization technique that exploits the phenomenon of spatial redundancy. Spatial redundancy generally predicts that video motion of a given video block will likely be similar to the video motion of another video block in close spatial proximity to the given video block. The initialization technique can more readily exploit this phenomenon to initialize motion estimation in a location within a search space that has a very high probability of including a video block that can be used for effective video encoding.

More specifically, the initialization technique may utilize motion vectors calculated for video blocks in close spatial proximity to a video block to be encoded in order to identify a location within the search space where a motion estimation routine can be initialized, i.e., the pixel location within the search space where the motion estimation routine commences. For example, as outlined in greater detail below, a mean pixel location, a median pixel location or a pixel location calculated using a weighted function may be calculated based on motion vectors previously determined for video blocks in close spatial proximity to a current video block to be encoded. Other linear or non-linear functions could also be used. In any case, by initializing the motion estimation routine in this manner, video encoding may be accelerated by reducing the number of comparisons required to locate a video block within the search space that is an acceptable match to the video block being encoded. The motion estimation routine may comprise a non-exhaustive search within a search space. As such, initialization within the search space may be an important part of the encoding process, providing a starting point likely to yield improved computational results within a given processing time.

Motion estimation techniques are also described that can be used to quickly identify the acceptable motion vector after initialization. The motion estimation techniques may perform a non-exhaustive search of a search space in order to limit the number of computations that are performed. In one example, a motion estimation routine may include defining a circle of radius (R) around the initialized pixel location, and comparing the current video block to be encoded to video blocks of the search space associated with a set of pixel locations within the circle. The routine may further include identifying a pixel location within the circle that identifies a video block yielding a lowest difference value, and encoding the current video block using a motion vector defined by the identified pixel location when the identified pixel location corresponds to a center of the circle.

If the identified pixel location within the circle that identifies the video block yielding the lowest difference value does not correspond to center of the circle of radius (R), a new circle of radius (R') can be defined around that pixel location. Radius (R) may be equal to radius (R'), although the technique is not limited in that respect. In any case, the motion estimation routine may further include determining a pixel location within the circle of radius (R') that identifies a video block yielding a lowest difference value, and encoding the current video block using a motion vector defined by that pixel location when the that pixel location corresponds to a center of the circle of radius (R'). The motion estimation routine may continue in a similar fashion, defining additional circles, if necessary, until the video block yielding the lowest difference value corresponds to the center of a circle. In many cases, the video block yielding the lowest difference value will be spatially close to the initial estimate. By defining circles until the video block yielding the lowest difference value corresponds to the center of a circle, an acceptable motion vector can be pinpointed very quickly, and unnecessary comparisons and computations may be reduced.

Additional encoding techniques are also described that can be used to improve real-time encoding, particularly when computation resources are limited. For example, during video encoding of a video frame, available computational resources may be monitored. If earlier video blocks of a video frame are encoded very quickly, the computational savings can be identified. In that case, later video blocks of the same video frame may be encoded using more exhaustive searching techniques, if desired, because computational savings associated with the earlier video blocks can be appropriated to the encoding of later video blocks.

The techniques described herein may be capable of providing one or more advantages. For example, the techniques may facilitate a reduction in power consumption during video encoding, and may facilitate effective real-time video encoding by accelerating the motion estimation routine. The techniques may also improve video encoding in terms of video quality and compression, particularly when computational resources are limited. In particular, the techniques may improve the level of data compression relative to some conventional searching techniques such as conventional diamond searching techniques. The encoding techniques described herein may be particularly useful in wireless digital video devices or other portable video devices where computational resources and bandwidth are more limited and power consumption is a concern.

FIG. 1 is a block diagram illustrating an example system 2 in which a source device 4 transmits an encoded sequence of video data over communication link 6 to a receive device 8. Source device 4 and receive device 8 are both digital video devices. In particular, source device 4 encodes and transmits video data using any one of a variety of video compression standards such as MPEG-4 developed by the Moving Picture Experts Group. Other standards may include MPEG-1, MPEG-2 or other MPEG standards developed by the Moving Picture Experts Group, ITU H.263 and similar standards, QuickTime™ technology developed by Apple Computer of Cupertino California, Video for Windows™ developed by Microsoft Corporation of Redmond, Wash., Indeo™ developed by Intel Corporation, and Cinepak™ developed by SuperMac Inc.

Communication link 6 may comprise a wireless link, a physical transmission line, a packet based network such as a local area network, wide-area network, or global network such as the Internet, a public switched telephone network (PSTN), or combinations of various links and networks. In other words, communication link 6 represents any suitable communication medium, or possibly a collection of different networks and links, for transmitting video data from source device 4 to receive device 8.

Source device 4 may be any digital video device capable of encoding and transmitting video data. For example, source device 4 may include a memory 22 for storing digital video sequences, a video encoder 20 for encoding the sequences, and a transmitter 14 for transmitting the encoded sequences over communication link 6. Video encoder 20, for example, may comprise a digital signal processor (DSP) that executes programmable software modules that define the encoding techniques.

Source device 4 may also include an image sensor 23, such as a video camera, for capturing video sequences and storing the captured sequences in memory 22. In some cases, source device 4 may transmit real-time video sequences over communication link 6. In those cases, receive device 8 may receive the real-time video sequences and display the video sequences to a user.

Receive device 8 may be any digital video device capable of receiving and decoding video data. For example, receive device 8 may include a receiver 15 for receiving encoded digital video sequences, a decoder 16 for decoding the sequences, and a display 18 for displaying the sequences to a user.

Example devices for source device 4 and receive device 8 include servers located on a computer network, workstations or other desktop computing devices, and mobile computing devices such as laptop computers or personal digital assistants (PDAs). Other examples include digital television broadcasting satellites and receiving devices such as digital televisions, digital cameras, digital video cameras or other digital recording devices, digital video telephones such as cellular radiotelephones and satellite radio telephones having video capabilities, other wireless video devices, and the like.

In some cases, source device 4 and receive device 8 each include an encoder/decoder (CODEC) (not shown) for encoding and decoding digital video data. In that case, both source device 4 and receive device 8 may include transmitters and receivers as well as memory and displays. Many of the encoding techniques outlined below are described in the context of a digital video device that includes an encoder. It is understood, however, that the encoder may form part of a CODEC. In that case, the CODEC may be implemented as a DSP, a microprocessor, an application specific integrated circuit (ASIC), discrete hardware components, or various combinations thereof.

Source device 4, for example, operates on blocks of pixels within the sequence of video frames in order to encode the video data. For example, video encoder 20 of source device 4 may execute motion estimation encoding techniques in which a video frame to be transmitted is divided into blocks of pixels (referred to as video blocks). For each video block in the video frame, video encoder 20 of source device 4 searches video blocks stored in memory 22 for the preceding video frame already transmitted (or a subsequent video frame) to identify a similar video block, and encodes the difference between the video blocks, along with a motion vector that identifies the video block from the previous frame (or subsequent frame) that was used for encoding. The motion vector may define a pixel location associated with the upper-left-hand corner of the video block, although other formats for motion vectors could be used. In any case, by encoding video blocks using motion vectors, the required bandwidth for transmission of streams of video data can be significantly reduced. In some cases, source device 4 may support programmable thresholds which can cause termination of various comparisons or computations during the encoding process in order to reduce the number of computations and conserve power.

Receiver 15 of receive device 8 may receive the encoded video data such as in the form of motion vectors and encoded differences. Decoder 16 performs motion compensation techniques to generate video sequences for display to a user via display 18. The decoder 16 of receive device 8 may also be implemented as an encoder/decoder (CODEC). In that case, both source device 4 and receive device 8 may be capable of encoding, transmitting, receiving and decoding digital video sequences.

Figure 2:
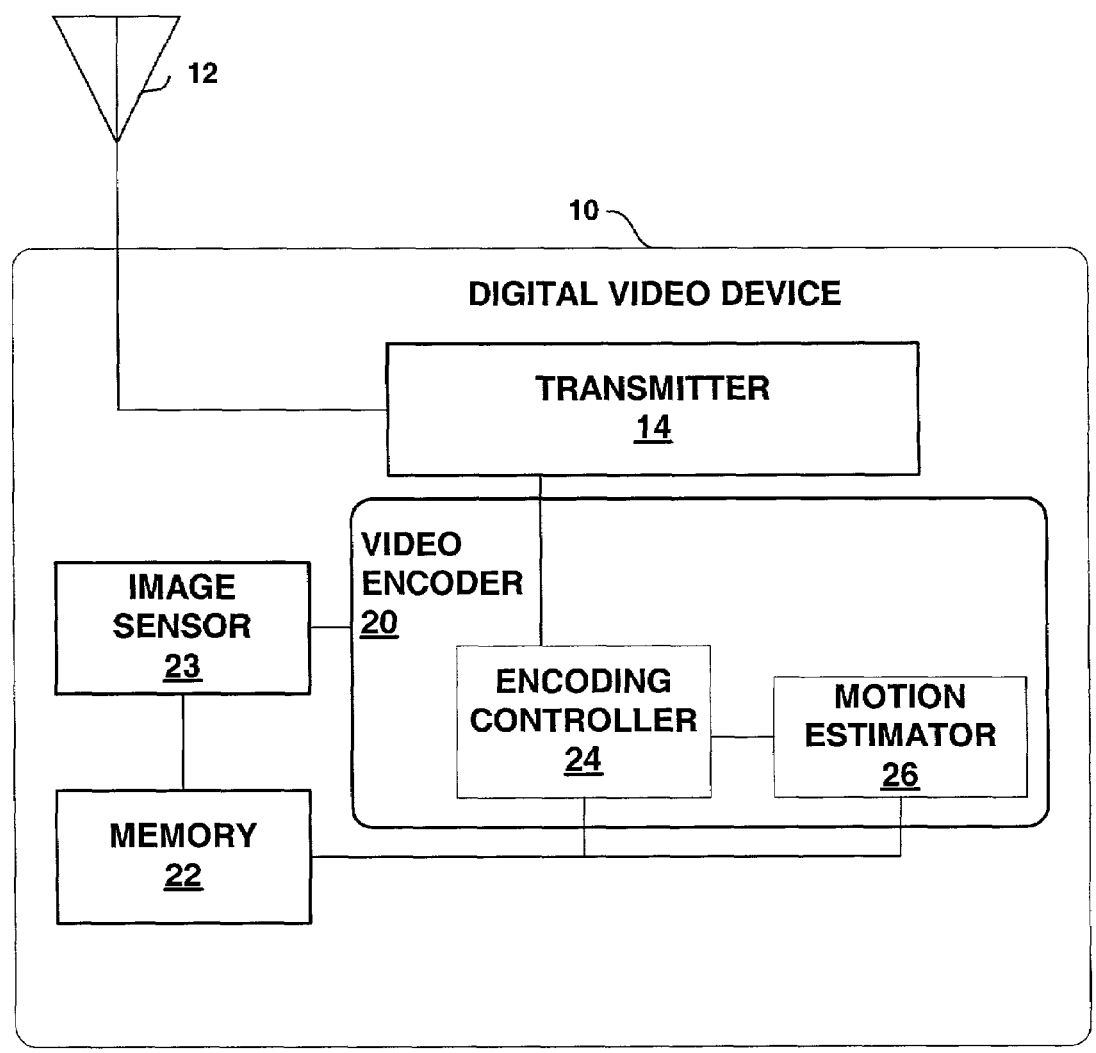
FIG. 2 is a block diagram illustrating an example digital video device incorporating a video encoder that encodes digital video sequences.

FIG. 2 is a block diagram illustrating an example digital video device 10, such as source device 4 incorporating a video encoder 20 that encodes digital video sequences according to one or more of the techniques described herein. Exemplary digital video device 10 is illustrated as a wireless device, such as a mobile computing device, a personal digital assistant (PDA), a wireless communication device, a radio telephone, and the like. However, the techniques in this disclosure are not necessarily limited to wireless devices, and may be readily applied to other digital video devices including non-wireless devices.

In the example of FIG. 2, digital video device 10 transmits compressed digital video sequences via transmitter 14 and antenna 12. Video encoder 20 encodes the video sequences and buffers the encoded digital video sequences within video memory 22 prior to transmission. For example, as mentioned above, video encoder 20 may comprise a programmable digital signal processor (DSP), a microprocessor, one or more application specific integrated circuits (ASICs), specific hardware components, or various combinations of theses devices and components. Memory 22 may store computer readable instructions and data for use by video encoder 20 during the encoding process. For example, memory 22 may comprise synchronous dynamic random access memory (SDRAM), FLASH memory, electrically erasable programmable read only memory (EEPROM), or the like.

In some cases, digital video device 10 includes an image sensor 23 for capturing video sequences. For example, image sensor 23 may capture video sequences and store them in memory 22 prior to encoding. Image sensor 23 may also be coupled directly to video encoder 20 in order to improve video encoding in real-time. Encoding techniques implementing an initialization routine and/or a motion estimation routine as outlined in greater detail below may accelerate the encoding process, reduce power consumption, increase data compression, and possibly facilitate real-time video encoding within devices with relatively limited processing capabilities.

By way of example, image sensor 23 may comprise a camera. In particular, image sensor 23 may include a charge coupled device (CCD), a charge injection device, an array of photodiodes, a complimentary metal oxide semiconductor (CMOS) device, or any other photosensitive device capable of capturing video images or digital video sequences.

Video encoder 20 may include an encoding controller 24 to control execution of an encoding algorithm. Video encoder 20 may also include a motion encoder 26 to execute the motion estimation techniques described herein. If desired, video encoder 20 may also include additional components such as a texture encoder (not shown) to perform intra-frame compression commonly used for compressing still images, such as discrete cosine transform (DCT) encoding. Texture encoding, for example, may be performed in addition to motion estimation, or possibly in lieu of motion estimation in scenarios where processing capabilities are deemed too limited for effective motion estimation.

The components of video encoder 20 may comprise software modules executing on the DSP. Alternatively, one or more components of video encoder 20 may comprise specifically designed hardware components, or one or more ASICs, that execute one or more aspects of the techniques described herein.

Figure 3:
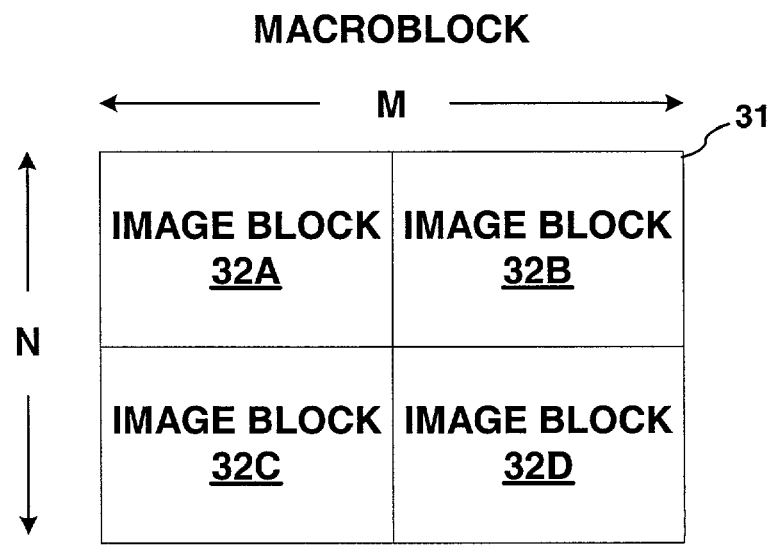
FIG. 3 is a conceptual illustration of an example macroblock of video data.

FIG. 3 illustrates an example video block in the form of a macroblock 31 that can be stored within memory 22. MPEG standards and other video encoding schemes make use of video blocks in the form of macroblocks during motion estimation video encoding. In MPEG standards, the term "macroblock" refers to a 16 by 16 collection of pixel values that form a subset of a video frame. Each pixel value may be represented by a byte of data, although larger or smaller number of bits could also be used to define each pixel in order to achieve the desired imaging quality. A macroblock may comprise a number of smaller 8 by 8 pixel image blocks 32. In general, however, the encoding techniques described herein may operate using blocks of any defined size, such as 16-byte by 16-byte macroblocks, 8-byte by 8-byte image blocks, or different sized video blocks, if desired.

Figure 4:
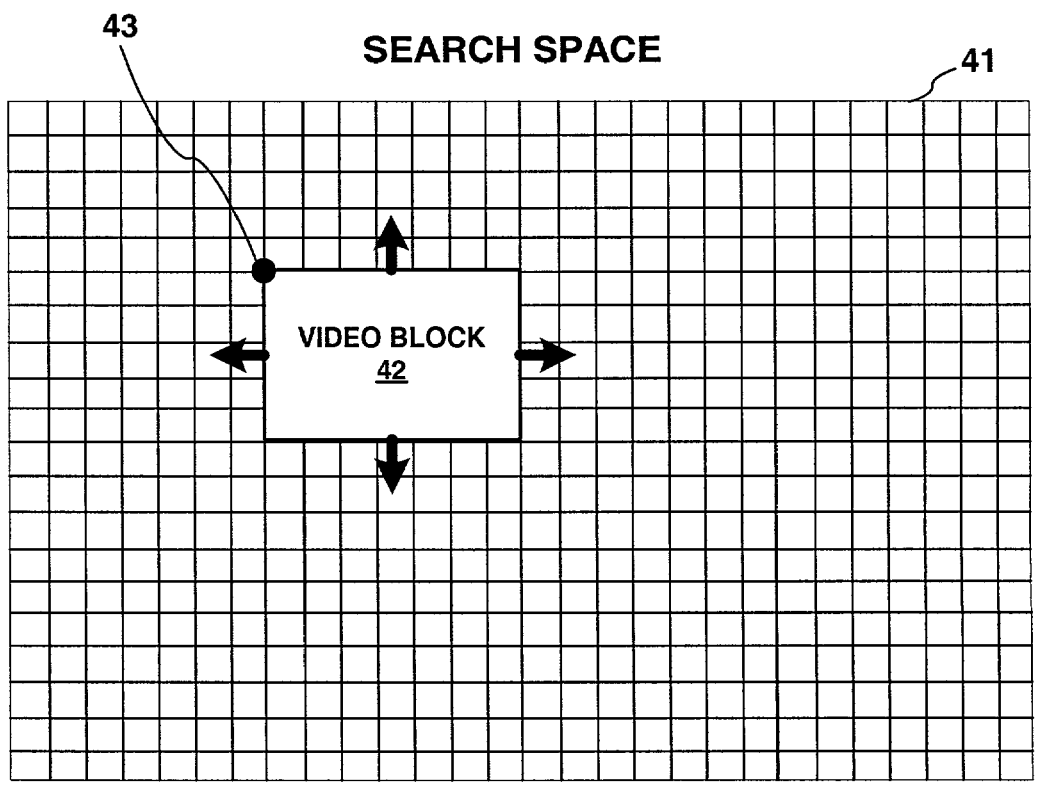
FIG. 4 is a conceptual illustration of an example search space.

FIG. 4 illustrates an example search space 41 that can be stored within memory. The search space 41 is a collection of video blocks corresponding to a previously transmitted video frame (or a subsequent video frame of a sequence of frames). The search space may comprise the previous or subsequent video frame in its entirety, or a subset of the video frame, if desired. The search space may be rectangular-shaped, as illustrated, or may assume any of a wide variety of shapes and sizes. In any case, during video encoding, the current video block to be encoded is compared to blocks in the search space 41 in order to identify an adequate match so that the differences between the current block and the similar video block in the search space can be transmitted along with a motion vector that identifies the similar video block.

Initialization techniques can exploit spatial redundancy phenomena so that initial comparisons of current video block 42 to video blocks in search space 41 are more likely to identify an acceptable match. For example, the techniques described below can be used to identify a pixel location 43, which may identify a video block within search space to which video block 42 should be initially compared. Initialization to a location that is close to the best matching video block can increase the likelihood of locating the best motion vector, and can reduce the average number of searches needed to locate an acceptable motion vector. For example, initialization can provide an improved starting point for the motion estimation routine, and improved computational results within a given period of processing time.

During motion estimation video encoding, the motion encoder 26 can compare current video blocks to be encoded with previous video blocks using comparison techniques such as Sum of Absolute Difference (SAD) techniques or Sum of Squared Difference (SSD) techniques. Other comparison techniques may also be used.

The SAD technique involves the tasks of performing absolute difference computations between pixel values of the current block to be encoded, with pixel values of the previous block to which the current block is being compared. The results of these absolute difference computations are summed, i.e., accumulated, in order to define a difference value indicative of the difference between the current video block and the previous video block to which the current video block is being compared. For an 8 by 8 pixel image block, 64 differences may be computed and summed, and for a 16 by 16 pixel macroblock, 256 differences may be computed and summed. A lower difference values generally indicates that a video block being compared to a current video block is a better match, and thus a better candidate for use in motion estimation encoding than video blocks yielding higher difference values. In some cases, computations may be terminated when an accumulated difference value exceeds a defined threshold. In that case, the additional computations may be unnecessary because the video block being compared to the current video block is not acceptable for effective use in motion estimation encoding.

The SSD technique also involves the task of performing difference computations between pixel values of the current block to be encoded with pixel values of the previous block to which the current block is being compared. In the SSD technique, the results of absolute difference computations are squared, and then the squared values are summed, i.e., accumulated, in order to define a difference value indicative of the difference between the current video block and the previous video block to which the current video block is being compared. Alternatively, other comparison techniques such as a Mean Square Error (MSE), a Normalized Cross Correlation Function (NCCF), or another suitable comparison algorithm may be performed.

Figure 5:
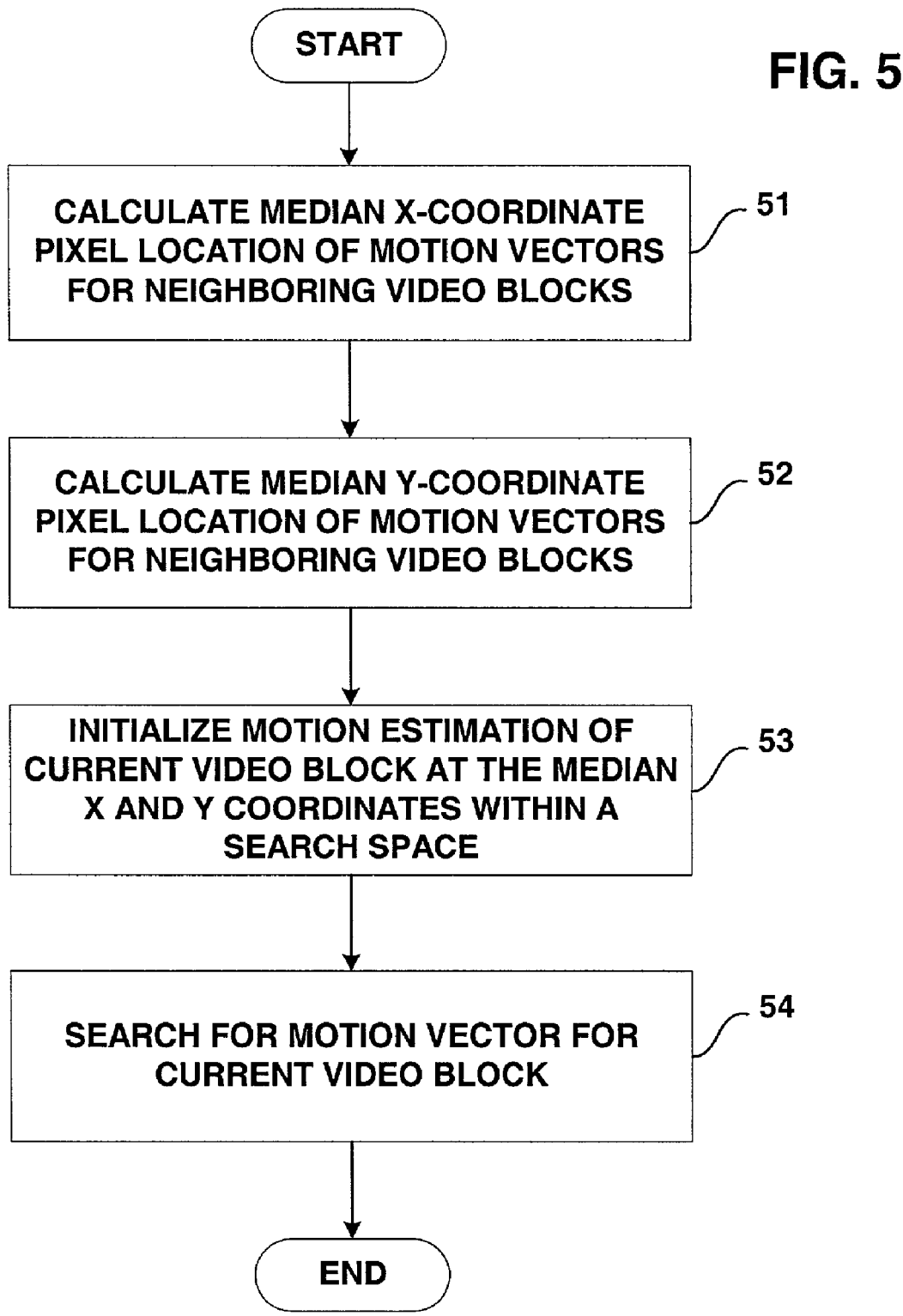
FIGS. 5 is a flow diagram illustrating a video encoding technique that can be implemented in a digital video device to initialize a motion estimation routine.

FIG. 5 is a flow diagram illustrating a video encoding technique that can be implemented in a digital video device to initialize a motion estimation routine. In the example of FIG. 5, video encoder 20 uses a median function to calculate an initialized pixel location within a search space. However, the same principles may be applied using other linear or non-linear functions, such as for example, a mean, or a weighted function.

As shown in FIG. 5, to initialize encoding of a current video block, encoding controller 24 calculates the median X-coordinate pixel location of motion vectors for neighboring video blocks (51). Similarly, encoding controller 24 calculates the median Y-coordinate pixel location of motion vectors for neighboring video blocks (52). In other words, previously calculated motion vectors associated a set of video blocks located at defined locations relative to the current video block to be encoded are used to calculate median X and Y coordinates. The neighboring video blocks may form a set of video blocks located at defined locations relative to the current video block. For example, the set of video blocks may be defined to include or exclude certain video blocks, depending on implementation. In any case, motion estimation of the current video block is then initialized at the median X and Y coordinates (53). Motion estimator 26 then searches for an acceptable motion vector for the current video block (54) using either conventional searching techniques, or a searching technique similar to that outlined in greater detail below.

Figure 6:
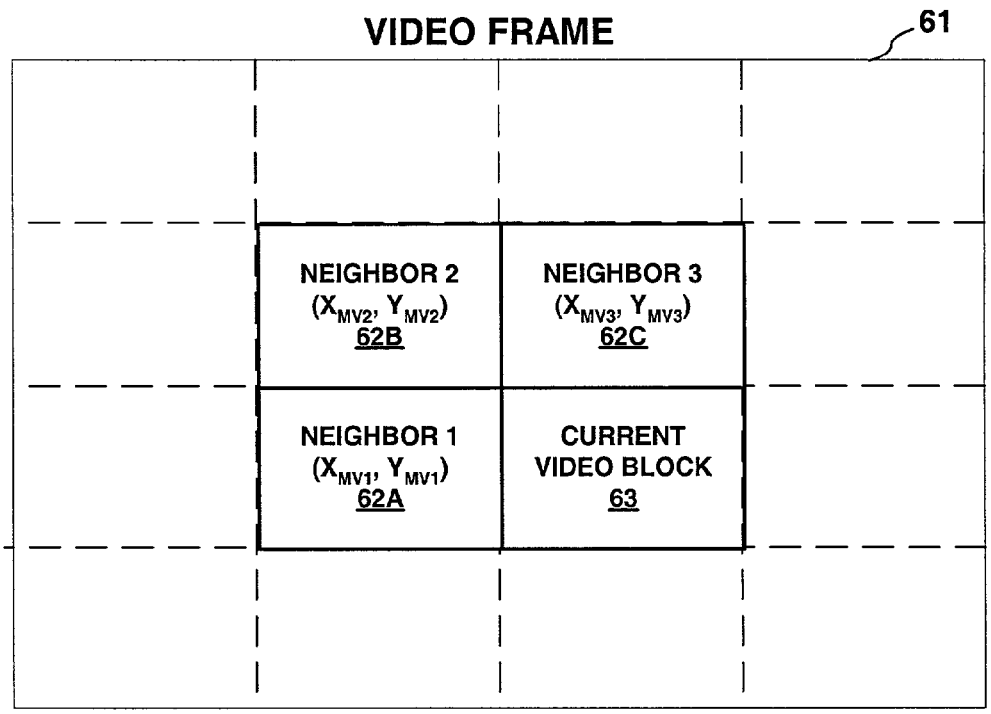
FIGS. 6-8 are conceptual illustrations of exemplary video frames in which a current video block is encoded using a technique similar to that illustrated in FIG. 5.

FIG. 6 is a conceptual illustration of an exemplary video frame in which a current video block is encoded using a technique similar to that illustrated in FIG. 5. In particular, motion estimation of current video block 63 may be initialized using previously calculated motion vectors associated with a set of video blocks located at defined locations relative to the current video block 63. In FIG. 6, the set of video blocks located at defined locations comprise neighbor 1 (62A), neighbor 2 (62B) and neighbor 3 (62C). However, as mentioned, the set may defined in a variety of other formats, to include or exclude video blocks located at various locations relative to the current video block 63.

In the example, of FIG. 6, the initialized location within a search space for performing motion estimation of current video block 63 can be defined by the following equations:

$$X_{Initial} = \text{Median}(X_{MV1}, X_{MV2}, X_{MV3})$$

$$Y_{Initial} = \text{Median}(Y_{MV1}, Y_{MV2}, Y_{MV3})$$

Alternatively, the mean function may be used, in which case the initialized location within a search space for performing motion estimation of current video block 63 can be defined by the following equations:

$$X_{Initial} = \text{Mean}(X_{MV1}, X_{MV2}, X_{MV3})$$

$$Y_{Initial} = \text{Mean}(Y_{MV1}, Y_{MV2}, Y_{MV3})$$

Other linear or non-linear mathematical equations or relationships between neighboring video blocks and the current video block to be encoded may also be used.

Figure 7:
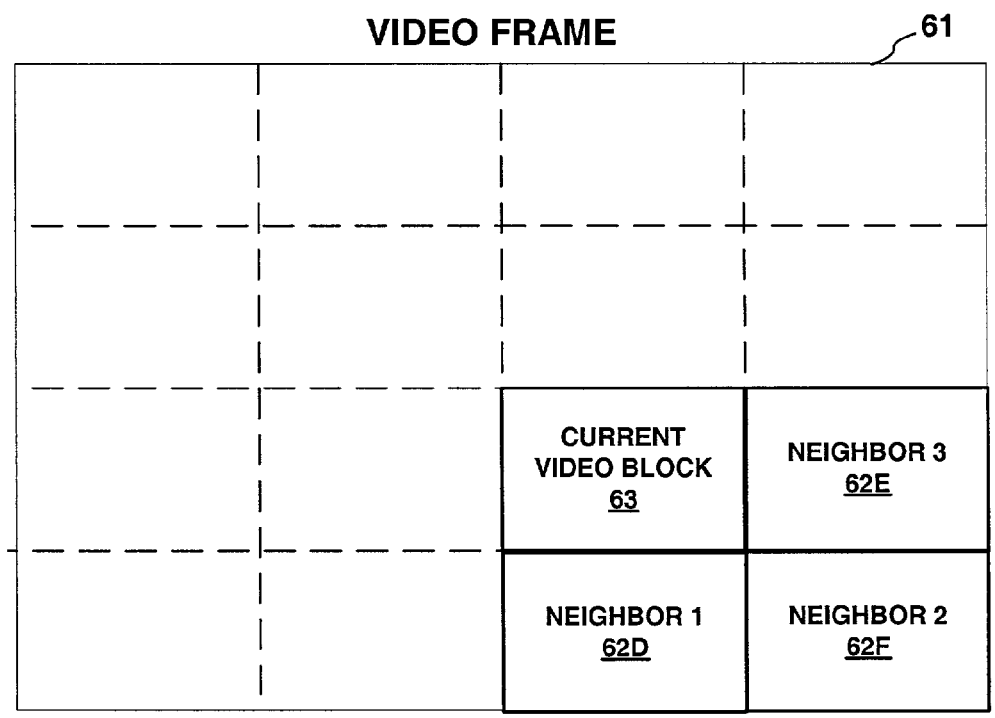

In any case, by defining the initialized location of the motion estimation search, encoding can be accelerated by increasing the probability that an acceptable match between a video block to be encoded and a video block in the search space can be identified very quickly. As shown in FIG. 7 (in comparison to FIG. 6), the neighboring video blocks that form a set of video blocks used to generate the initialized location may include blocks in other defined locations relative to a location of current video block 63. In many cases, the location of neighbors 62 relative to current video block 63 may depend on the direction in which video blocks of frame 61 are encoded.

For example, the adjacent video blocks to current video block 63 that were already encoded generally have motion vectors that were already calculated, whereas other adjacent video blocks that are not yet encoded generally do not have motion vectors. Thus, neighbors 62A-62C (FIG. 6) comprising a subset of adjacent video blocks to current video block 63 may be used if the encoding of video blocks proceeds left-to-right, up-down, beginning with the upper left-most video block of frame 61. Alternatively, neighbors 62D-62F (FIG. 7) comprising a different subset of adjacent video blocks to current video block 63 may be used if the encoding of video blocks proceeds right-to-left, down-up, beginning with the lower right-most video block of frame 61. Many other variations on the set of video blocks used to generate the initialized location may be defined in accordance with the principles of this disclosure. For example, if very high levels of motion takes place in the video sequence, defined video block locations relative to current video block 63 that are much further from video block 63 than the immediately adjacent blocks may be included in the set.

The initialization technique of FIG. 5 may not be used for the first video block of frame 61 to be encoded because motion vectors for neighboring video blocks would be unavailable at that point. The initialization routine, however, may begin anytime thereafter, once one or more motion vectors for neighboring video blocks have been identified. In one specific case, the initialization technique may begin with the encoding of the second video block in the second row. Before that point, motion vectors for three adjacent neighbors are typically not defined. In other cases, however, the initialization routine may begin anytime a motion vector has been calculated for at least one neighbor of the video block to be encoded.

Figure 8:
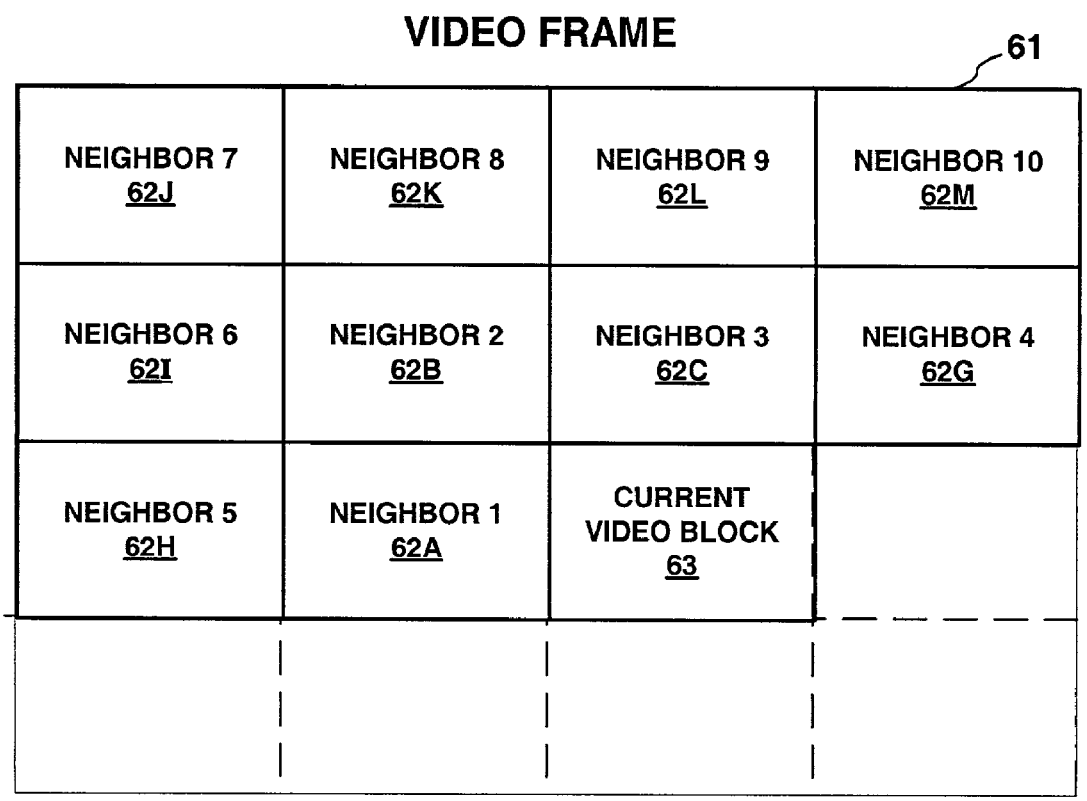

As shown in FIG. 8, motion vectors associated with a larger number of neighbors to current video block 63 may be used to calculate the initialized location within the search space. As more motion vectors have been calculated for more neighbors, more motion vectors may be used to calculate the initialized location for performing motion estimation on a current video block. In some cases, in order to more fully exploit the phenomenon of spatial correlation, motion vectors associated with neighbors in closer spatial proximity to current video block 42 may be given more weight in the calculation of the initial location than motion vectors associated with neighbors that are spatially further away from current video block 42. In other words, a weighted function, such as a weighted mean or a weighted median may be used to calculate the initialized pixel location. For example, motion vectors associated with neighbors 1-4 (62A, 62B, 62C and 62G) may be given more weight than motion vectors associated with neighbors 5-10 (62H-62M) because neighbors 1-4 may be statistically more likely to be the video block used in motion estimation encoding. These and other potential modifications will become apparent in view of this disclosure.

Figure 9:
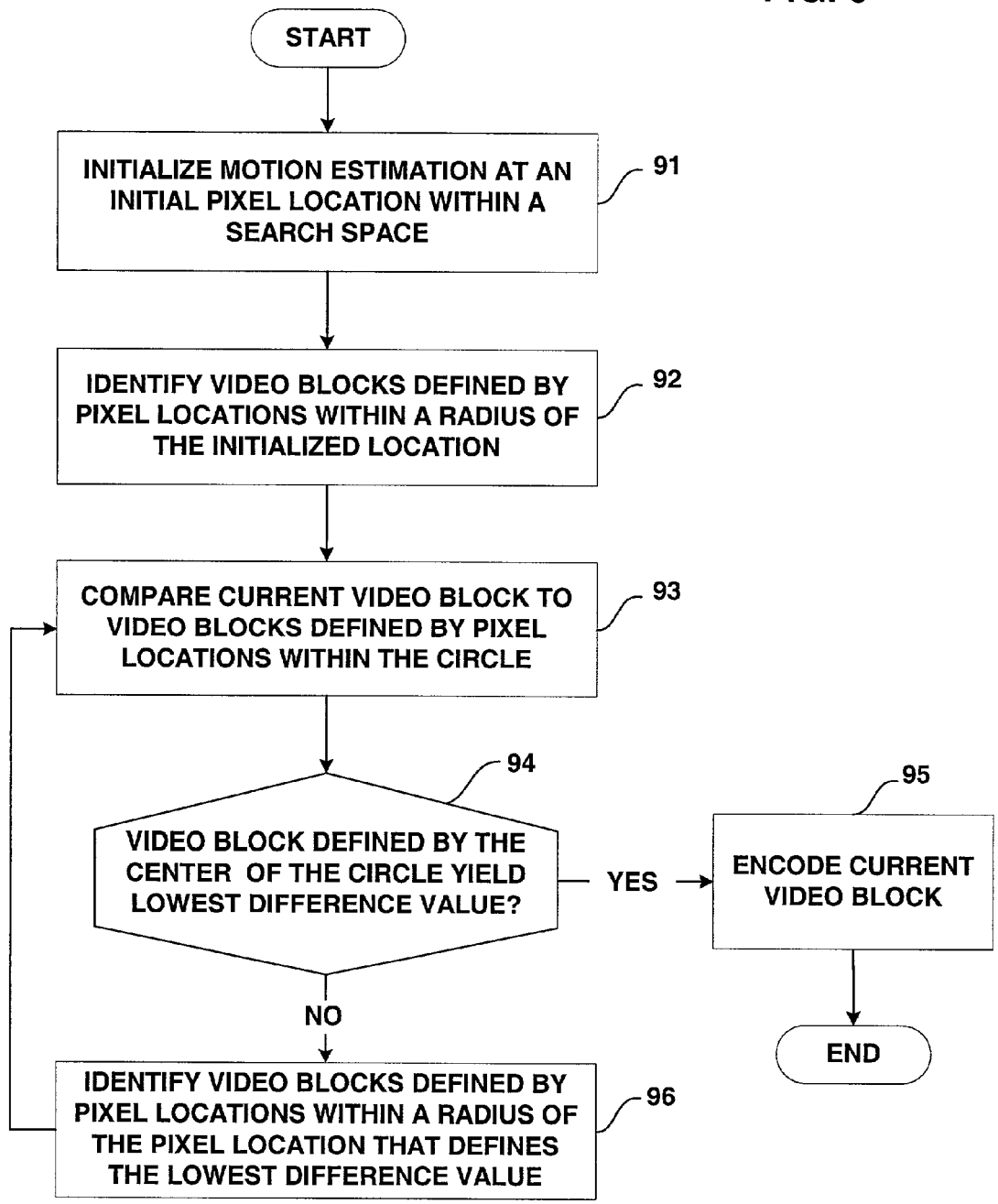
FIG. 9 is a flow diagram illustrating a video encoding technique that can be implemented in a digital video device to perform motion estimation.

FIG. 9 is a flow diagram illustrating a video encoding technique that can be implemented in a digital video device to perform motion estimation. The technique may involve a non-exhaustive search of video blocks in a search space in order to reduce the number of computations required for video encoding. As shown, encoding controller 24 initializes motion estimation based on motion vectors calculated for neighboring video blocks of the frame (91). For example, the initialization process may comprise a process similar to that illustrated in FIG. 5 in which neighboring video blocks used for initialization comprise a set of video blocks located at defined locations relative to the current video block to be encoded.

Once the initialized location has been calculated, motion estimator 26 identifies a set of video blocks defined by pixel locations within a circle of radius (R) of the initialized location (92). For example, radius (R) may be large enough to define a circle that includes at least five pixels, although larger radiuses may also be defined. More preferably, radius (R) may be large to define a circle that includes at least nine pixels, i.e., the initialized pixel location, and all eight pixel locations that immediately surround the initialized location. The inclusion of the initialized pixel location, and all eight pixel locations that immediately surround the initialized location can improve the searching technique by anticipating motion in every possible direction relative to the initialized location.

Motion estimator 26 then compares the current video block to be encoded to video blocks defined by pixel locations within the circle (93). Motion estimator 26 can then identify the video block within the circle that yields the lowest difference value. If the video block defined by the center of the circle of radius (R) yields the lowest difference value, i.e., the lowest different metric as defined by the comparison technique used (yes branch of 94), then motion estimator 26 encodes the current video block using a motion vector that identifies the video block defined by the center of the circle of radius (R) (95). For example, SAD or SSD comparison techniques as outlined above may be used. However, if the video block defined by the center of the circle of radius (R) does not yield the lowest difference value (no branch of 94), motion estimator 26 identifies the video blocks defined by pixel locations within a radius (R') of the pixel location that identifies the video block yielding a lowest difference value (76).

Motion estimator 26 then compares the current video block to be encoded to video blocks defined by pixel locations within the circle of radius (R') (93). Motion estimator 26 can identify the video block within the circle of radius (R') that yields the lowest difference value. If the video block defined by the center of the circle of radius (R') yields the lowest difference value, i.e. the lowest different metric as defined by the comparison technique used (yes branch of 94), then motion estimator 26 encodes the current video block using a motion vector that identifies the video block defined by the center of the circle of radius (R') (95). However, if the video block defined by the center of the circle of radius (R') does not yield the lowest difference value (no branch of 94), motion estimator 26 continues the process of defining yet another circle of radius (R"), and so forth.

Each subsequent circle defined around the pixel location that yielded the lowest difference value may have the same radius as a previous circle, or a different radius, if desired. By defining a radius relative to the most previously identified pixel location that identifies the video block in the search space that yields the lowest difference value, the best video block for use in motion estimation can be identified quickly without requiring an exhaustive search of the search space. In addition, simulations have shown that a searching technique as illustrated in FIG. 9 can achieve improved compression relative to conventional diamond searching techniques which operate to minimize the difference value of a video block associated with a pixel located at the center of a diamond-shaped set of pixels.

FIGS. 10-13 are conceptual illustrations of a search space in which a video encoding technique similar to that illustrated in FIG. 9 is performed to locate an acceptable motion vector. Each point on the grid represents a pixel location that identifies a unique video block in the search space. The motion estimation routine may be initialized at pixel location (X5, Y6), such as by performing the initialization routine illustrated in FIG. 5. Upon locating the initialized location (X5, Y6), motion estimator 26 defines a circle of radius (R) and compares video blocks within the search space associated with pixel locations within the circle of radius (R) to the current video block to be encoded. Motion estimator 26 can then identify the video block within the circle of radius (R) that yields the lowest difference value.

Figure 11:
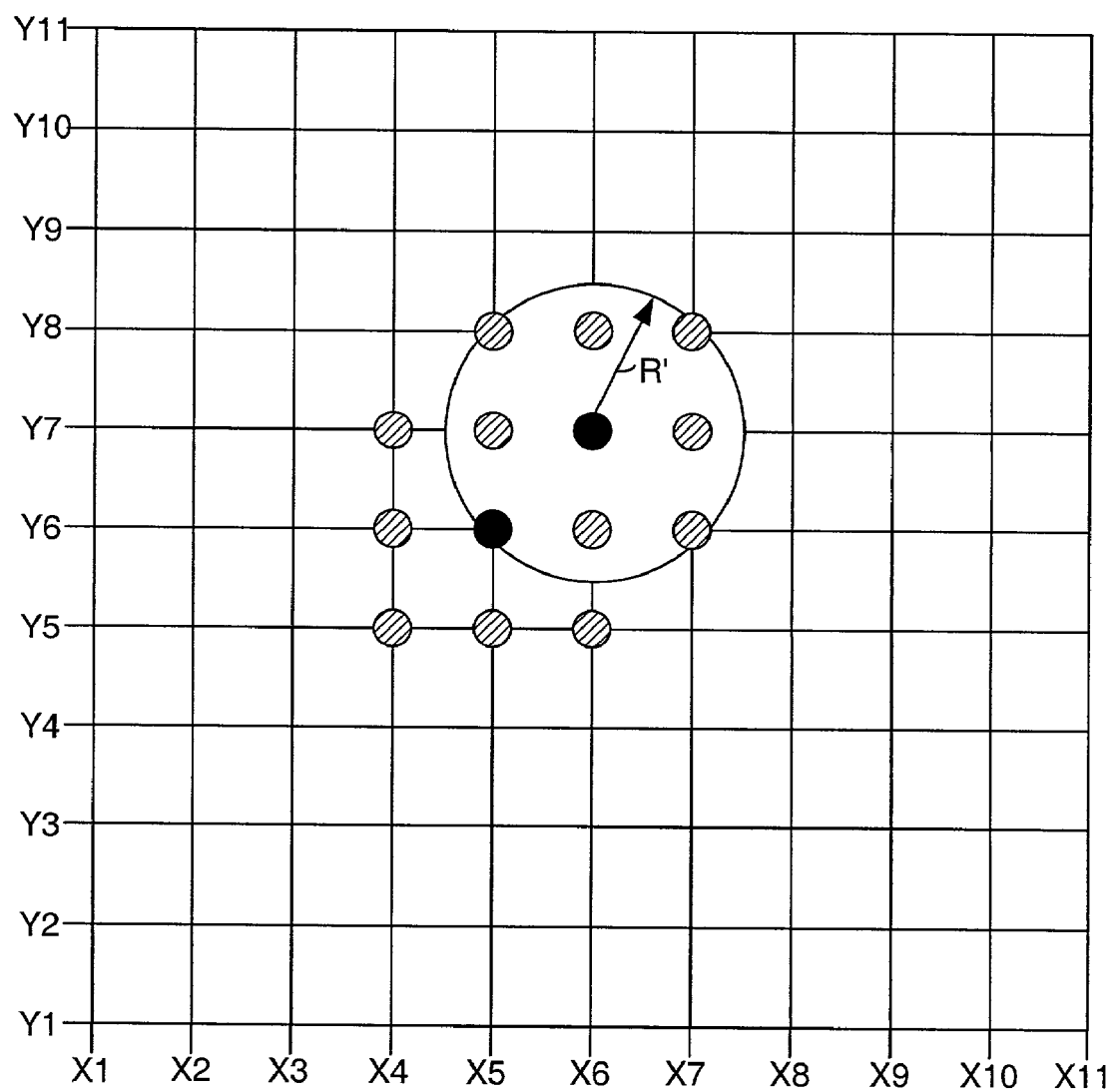
Figure 12:
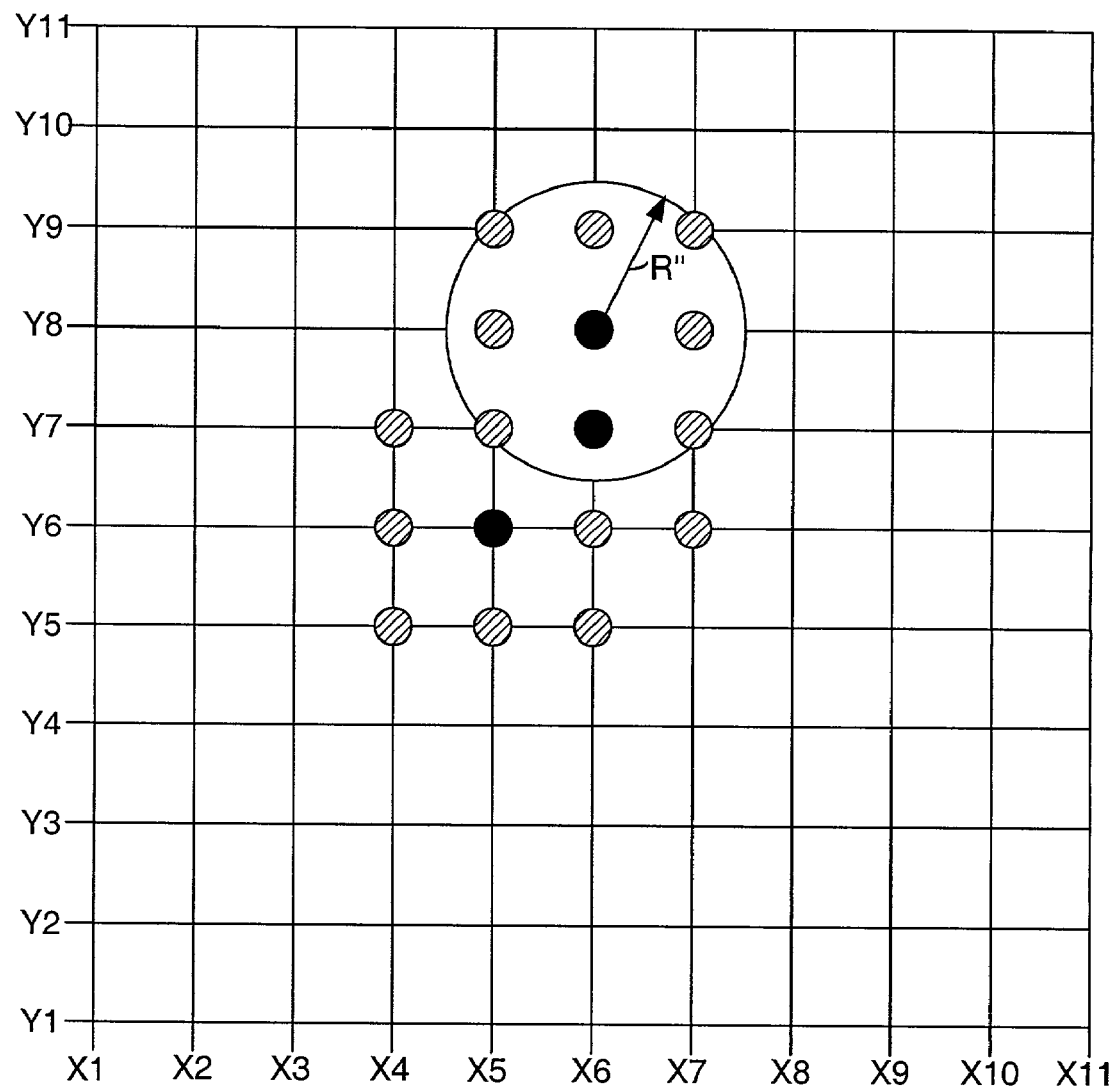
Figure 13:
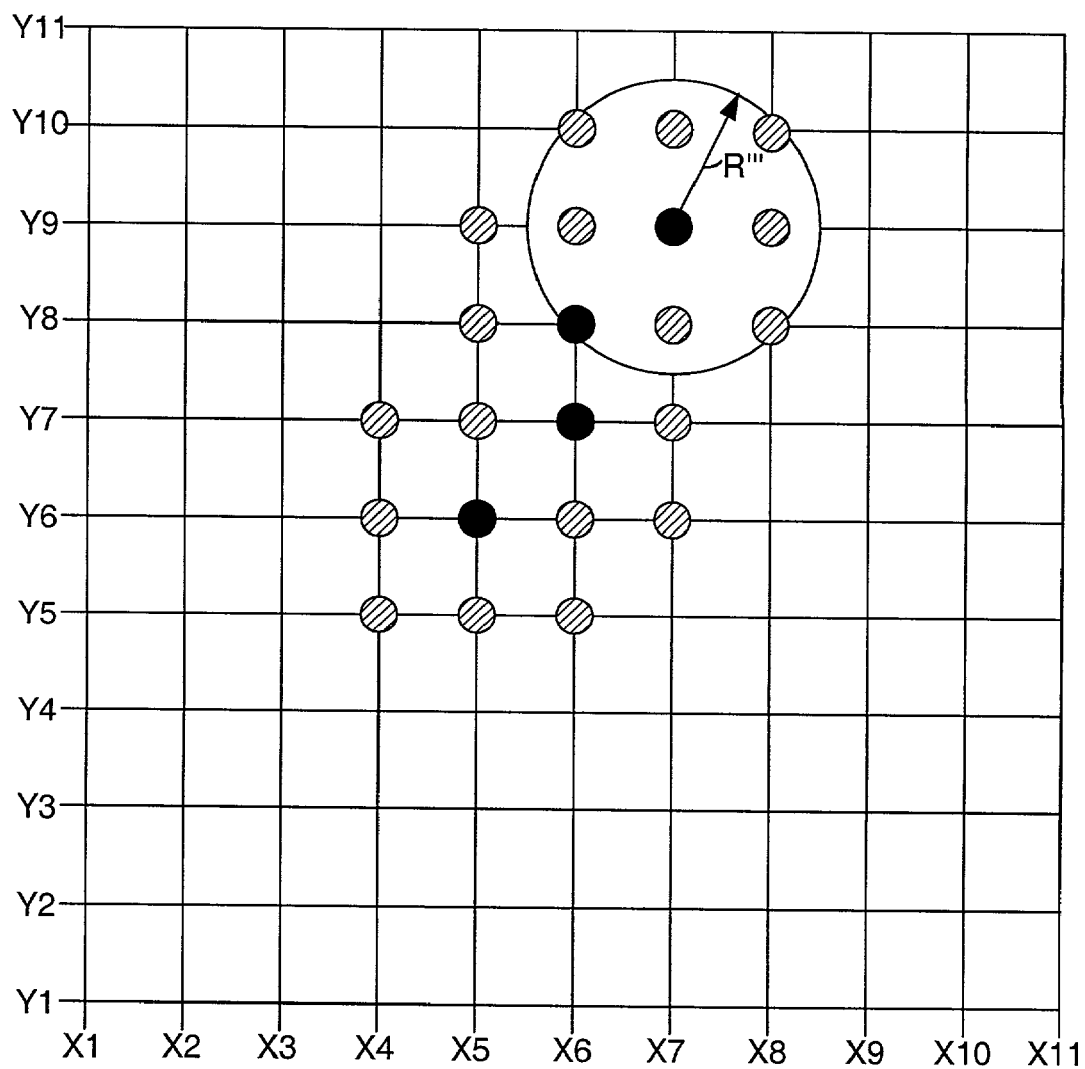

If motion estimator 26 determines the pixel location (X6, Y7) identifies the video block yielding the lowest difference value, motion estimator 26 defines a circle of radius (R') around pixel location (X6, Y7) as illustrated in FIG. 11. Motion estimator 26 then compares video blocks within the search space associated with pixel locations within the circle of radius (R') to the current video block to be encoded. If motion estimator 26 determines that the pixel location (X6, Y8) identifies the video block yielding the lowest difference value, motion estimator 26 defines yet another circle of radius (R") around pixel location (X6, Y8) as illustrated in FIG. 12. Motion estimator 26 then compares video blocks within the search space associated with pixel locations within the circle of radius (R") to the current video block to be encoded. If motion estimator 26 determines that the pixel location (X7, Y9) identifies the video block yielding the lowest difference value, motion estimator 26 defines another circle of radius (R'") around pixel location (X7, Y9) as illustrated in FIG. 13. Motion estimator 26 then compares video blocks within the search space associated with pixel locations within the circle of radius (R'") to the current video block to be encoded. Eventually, motion estimator 26 should locate a pixel location yielding the lowest difference value that corresponds to a center of a circle. At that point, motion estimator can use the pixel location yielding the lowest difference value that also corresponds to a center of a circle as the motion vector for the current video block.

Figure 10:
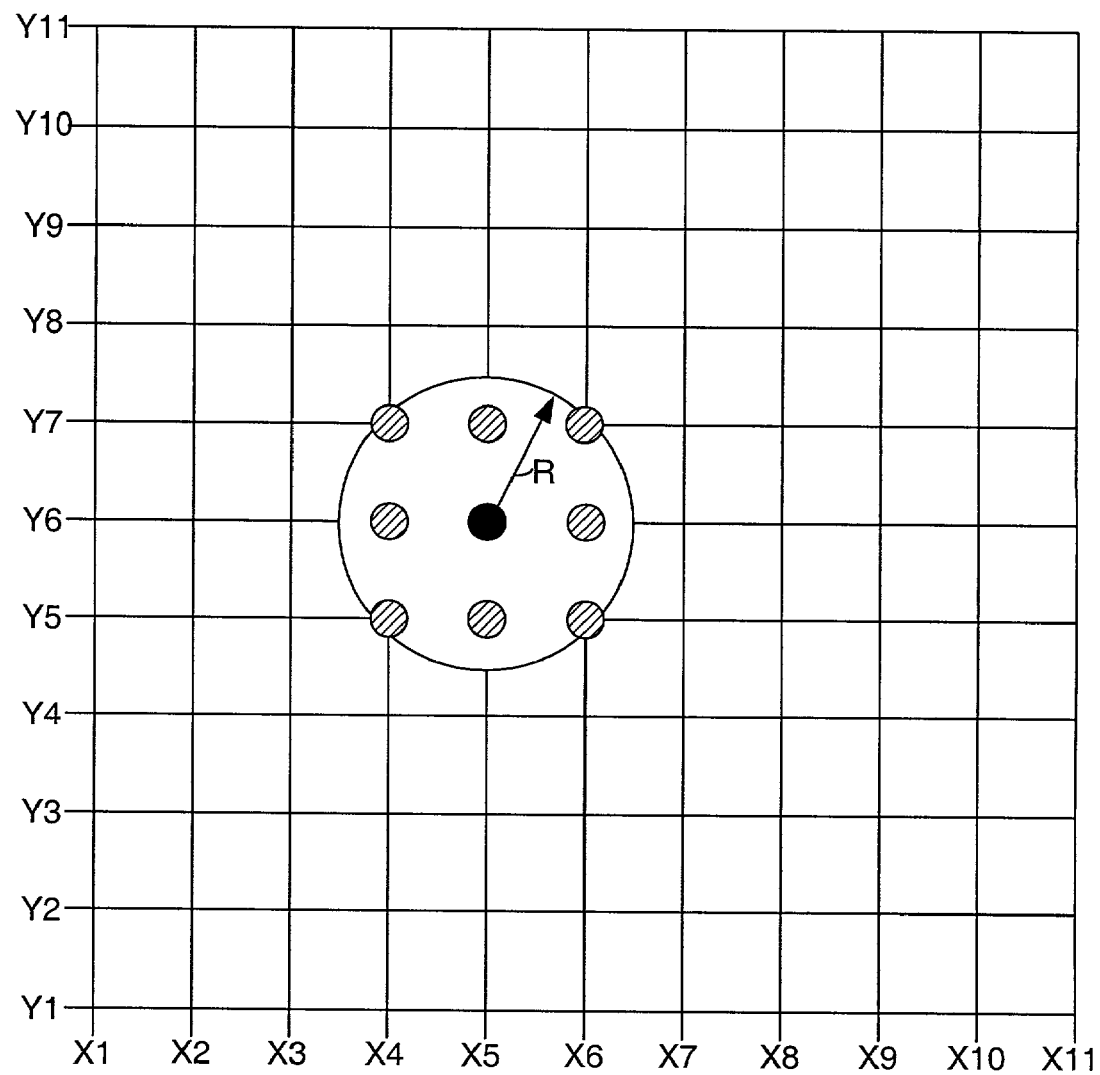
FIGS. 10-13 are conceptual illustrations of a search space in which a video encoding technique similar to that illustrated in FIG. 9 is performed to locate an acceptable motion vector.

As each new circle is defined, only the comparisons associated with pixel locations that were not included in the previous circle may need to be performed. In other words, referring to FIG. 11, in relation to the circle of radius (R'), only the video blocks associated with pixel locations (Y8, X5), (Y8, X6), (Y8, X7), (Y7, X7) and (Y6, X7) may need to be performed at that point. The video blocks associated with the other pixel locations within the circle of radius (R'), i.e., (Y7, X5), (Y7, X6), (Y6, X5) and (Y6, X6) were already performed in relation to the circle of radius (R) (FIG. 10).

The radii (R), (R'), (R"), (R'"), and so forth, may be equal to one another, or may differ, depending on implementation. Also, in some cases, the radii may be defined such that a larger number of pixels are included in each set, which may improve the likelihood of locating the best motion vector. However, larger radii may increase the number of computations for any given search. In any case, however, defining circles around each pixel location yielding the lowest difference value may have advantages over other techniques. For example, when circles are defined around pixel locations, every adjacent pixel location may be examined during the comparison. In other words, all eight pixel locations that immediately surround the center pixel may be included within a defined circle. Still, an exhaustive search requiring comparisons of every possible video block defined by every pixel in the search space can be avoided, which can result in accelerated video encoding.

Figure 14:
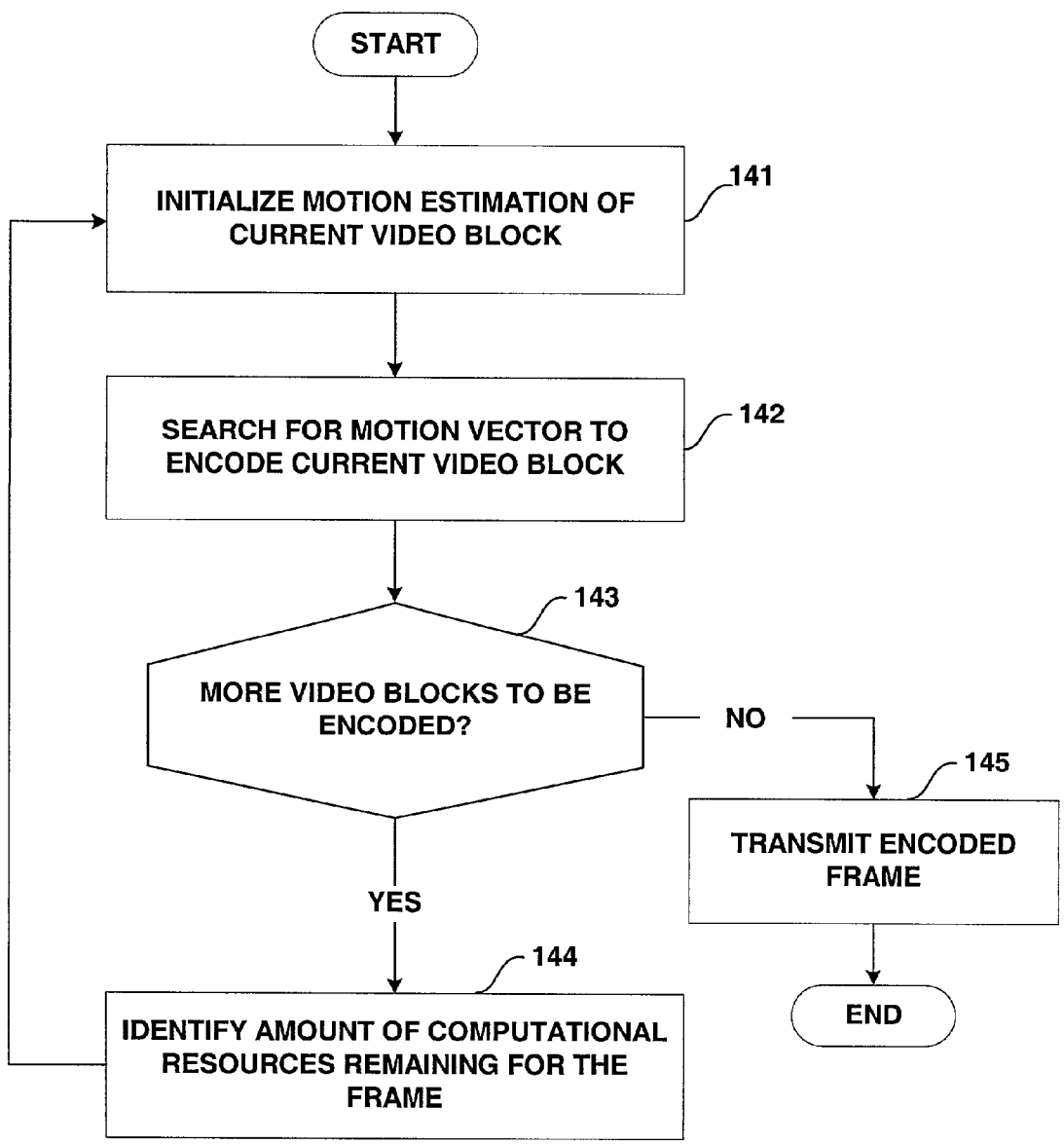
FIG. 14 a flow diagram illustrating a video encoding technique that can be implemented in a digital video device to promote real-time video encoding.

FIG. 14 a flow diagram illustrating another video encoding technique that can be implemented in a digital video device to improve video encoding in real-time. As shown, encoding controller 24 initializes motion estimation of a current video block of a video frame being encoded (141). For example, the initialization process may include a process similar to that illustrated and described with reference to FIGS. 5-8, wherein an initial pixel location within a search space is identified. In addition, the initialization process may include defining the scope of the search that may be performed to encode the current video block. If the current video block is a first video block to be encoded for a video frame, the scope of the search may be defined by a default value programmed into encoding controller 24.

After initialization, motion estimator 26 searches for motion vectors within a search space in order to encode the current video block (142). For example, the searching and encoding process may include a process similar to that illustrated and described with reference to FIGS. 9-13, wherein circles are defined around the pixel locations until a pixel location yielding the lowest difference value corresponds to a center of a circle. The scope of the search may be limited, such as by limiting an amount of time that searching can occur, or by limiting the size of the circles used. Again, the scope of the search may be defined by the initialization as mentioned above.

If the video frame being encoded includes additional video blocks (yes branch of 143), encoding controller 24 identifies an amount of computational resources remaining for the frame (144). Encoding controller 24 then initializes motion estimation of the subsequent video block of the video frame being encoded (141). The amount of available resources may have increased in comparison to resources available to encode the previous video block if computational savings were realized during encoding of the earlier video block. The computational resources may be defined by the clock speed of the video encoder, and the desired resolution of the video sequence to be transmitted in terms of frames per second.

When encoding controller 24 initializes motion estimation of the subsequent video block of a video frame being encoded, the initialization process again includes a process of defining the scope of the search. In that case, however, the scope of the search may be based on the identified amount of available computational resources. Thus, if encoding of a first video block is performed very quickly, subsequent video blocks may be encoded using more exhaustive searches. For example, the radii used to define circles around the pixel locations may be increased when more computational resources are available. These or similar techniques can improve the quality of video encoding in real time when computational resources are limited, such as by improving the compression ratio of encoded video blocks. Once all of the video blocks of a video frame have been encoded (no branch of 143), device 10 can transmit the encoded frame via transmitter 14 and antenna 12 (145).

Table 1 lists data collected during simulation of the techniques outlined above in relation to other conventional techniques. Encoding was carried out on a video sequence having a relatively large amount of motion. The same video sequence was also encoded using conventional diamond searching techniques and an exhaustive searching technique in which all of the video blocks of the search space were compared to the video block to be encoded. For each technique, Table 1 lists the file size, the signal-to-noise ratio, the average number of searches per macroblock, the maximum number of searches per macroblock, and the number of searches required for a frame in the worst case. The label "Circle Search" refers to an encoding technique that used processes similar to FIG. 5 and FIG. 9. As can be appreciated by Table 1, the techniques described herein may be capable of achieving improved compression with a reduced number of searches relative to conventional diamond searching. The techniques described herein may not achieve the level of compression of the full search. In the example, however, the Circle Search technique required an average of only 17.2 searches per macroblock, compared to 21.3 searches per macroblock for the diamond search, and 1024 searches per macroblock for the full search.

TABLE 1

|  | Circle Search | Diamond Search | Full Search |
| --- | --- | --- | --- |
| File Size | 61.1 Kilobytes | 65.7 Kilobytes | 54.8 Kilobytes |
| S/N ratio | 32.1 | 32.1 | 31.9 |
| Ave. Searches/block | 17.2 | 21.3 | 1024 |
| Max Searches/block | 32 | 32 | — |
| Worst Case Frame (Searches) | 2614 | 2650 | — |

A number of different embodiments have been described. For example, video encoding techniques for initializing a search within a search space, as well as motion estimation techniques for performing the search have been described. The techniques may be capable of improving video encoding by avoiding computations in certain scenarios, accelerating the encoding process, improving compression, and possibly reducing power consumption during video encoding. In this manner, the techniques can improve video encoding according to standards such as MPEG-4, and can better facilitate the implementation of video encoding within wireless devices where computational resources are more limited and power consumption is a concern. In addition, the techniques may not affect interoperability with decoding standards such as the MPEG-4 decoding standard.

Nevertheless, various modification may be made without departing from the scope of the following claims. For example, the initialization routine may be extended to calculate multiple initial pixel locations within a search space. For example, different linear or non-linear functions may be used to calculate two or more initialized locations based on motion vectors of a set of video blocks at defined locations relative to the video block to be encoded. Also, two or more different sets of video blocks located at defined locations relative to the video block to be encoded may be used to calculated the two or more initialized locations. In some scenarios, the calculation of two or more initialized locations may accelerate the encoding process even further. These and other modifications will become apparent in light of this disclosure.

The techniques described herein may be implemented in hardware, software, firmware, or any combination thereof. If implemented in software, the techniques may be directed to a computer readable medium comprising program code, that when executed in a device that encodes video sequences compliant with an MPEG-4 standard, performs one or more of the methods mentioned above. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case, a processor such as a DSP may execute instructions stored in memory in order to carry out one or more of the techniques described herein. In some cases, the techniques may be executed by a DSP that invokes various hardware components to accelerate the encoding process. In other cases, the video encoder may be implemented as a microprocessor, one or more application specific integrated circuits (ASICs), one or more field programmable gate arrays (FPGAs), or some other hardware-software combination. These and other embodiments are within the scope of the following claims.

The invention claimed is:

1. A device comprising:
    an encoder that encodes video frames, wherein the encoder:
        identifies a pixel location associated with a video block in a search space based on calculated motion vectors associated with a set of video blocks within a video frame, the video blocks in the set being located at three or more neighboring locations relative to a current video block of the video frame to be encoded;
        initializes a motion estimation routine for the current video block at the identified pixel location;
        defines a circle around the identified pixel location;
        compares the current video block to those video blocks of the search space associated with pixel locations within the circle;
        identifies a second pixel location within the circle that identifies a video block yielding a lowest difference value; and
        encodes the current video block using the motion estimation routine when the identified second pixel location corresponds to a center of the circle; and
    a transmitter that transmits the encoded video frames.

2. The device of claim 1, wherein when the encoder identifies the pixel location, the encoder calculates a set of pixel coordinates based on the motion vectors associated with the video blocks in the set of video blocks located at the three or more neighboring locations relative to the current video block.

3. The device of claim 2, wherein when the encoder calculates the set of pixel coordinates, the encoder calculates a median based on the motion vectors of the video blocks in the set of video blocks located at the three or more neighboring locations relative to the current video block.

4. The device of claim 2, wherein when the encoder calculates the set of pixel coordinates, the encoder calculates a mean based on the motion vectors of the video blocks in the set of video blocks located at the three or more neighboring locations relative to the current video block.

5. The device of claim 2, wherein when the encoder calculates the set of pixel coordinates, the encoder calculates a weighted function based on the motion vectors of the video blocks in the set of video blocks located at the three or more neighboring locations relative to the current video block, wherein those motion vectors associated with corresponding video blocks in the set of video blocks which are spatially closer to the current video block are given more weight in the weighted function than other motion vectors associated with corresponding video blocks in the set of video blocks that are spatially further from the current video block.

6. The device of claim 1, wherein the encoder further dynamically adjusts a number of computations to be performed based on a determined amount of computational resources available to encode the current video block.

7. A device comprising:
    an encoder that encodes the video frames, the encoder comprises:
        means for initializing a motion estimation routine at a first pixel location within a search space to encode a current video block of a video frame;
        means for defining a circle of radius R around the first pixel location;
        means for comparing the current video block to video blocks of the search space associated with a set of pixel locations within the circle;
        means for identifying a second pixel location within the circle, from the set of pixel locations, that identifies a video block yielding a lowest difference value; and
        means for encoding the current video block using a motion vector defined by the identified second pixel location when the identified second pixel location corresponds to a center of the circle; and
    a transmitter that transmits the encoded video frames.

8. The device of claim 7, wherein the encoder further comprises:
    means for defining a second circle of a second radius R' around the second pixel location when the identified second pixel location does not correspond to the center of the circle with the radius R;
    means for identifying a third pixel location within the second circle that identifies a video block yielding a lowest difference value; and
    means for encoding the current video block using a motion vector defined by the third pixel location when the third pixel location within the second circle corresponds to a center of the second circle.

9. The device of claim 7, wherein the device is selected from the group consisting of: a digital television, a wireless communication device, a personal digital assistant, a laptop computer, a desktop computer, a digital camera, a digital recording device, a cellular radiotelephone having video capabilities, and a satellite radiotelephone having video capabilities.

10. A method of video encoding comprising the method steps of:
    identifying a pixel location in a search space based on motion vectors of a set of video blocks within a video frame by an encoder, the video blocks in the set being located at three or more neighboring locations relative to a current video block of the video frame to be encoded;
    initializing a motion estimation routine for the current video block at the identified pixel location by the encoder;
    identifying a second pixel location within a circle around the identified pixel location that identifies a video block yielding a lowest difference value by the encoder; and
    encoding the current video block using the motion estimation routine when the identified second pixel location corresponds to a center of the circle by the encoder.

11. The method of claim 10, wherein the video blocks in the set that are located at the three or more neighboring locations relative to the current video block comprise video blocks adjacent to the current video block.

12. The method of claim 10, wherein the step of identifying the pixel location comprises the step of: calculating a set of pixel coordinates based on the motion vectors calculated for the video blocks in the set of video blocks located at the three or more neighboring locations relative to the current video block.

13. The method of claim 12, wherein the step of calculating the set of pixel coordinates includes the step of: calculating a median based on the motion vectors calculated for the video blocks in the set of video blocks located at the three or more neighboring locations relative to the current video block.

14. The method of claim 12, wherein the step of calculating the set of pixel coordinates includes the step of: calculating a mean based on the motion vectors calculated for the video blocks in the set of video blocks located at the three or more neighboring locations relative to the current video block.

15. The method of claim 12, wherein the step of calculating the set of pixel coordinates includes the step of: calculating a weighted function based on the motion vectors calculated for the video blocks in the set of video blocks located at the three or more neighboring locations relative to the current video block, wherein those motion vectors calculated for corresponding video blocks in the set of video blocks that are spatially closer to the current video block are given more weight in the weighted function than other motion vectors calculated for corresponding video blocks in the set of video blocks that are spatially further from the current video block.

16. The method of claim 10, further comprising dynamically adjusting a number of computations to be performed based on a determined amount of computational resources available to encode the current video block.

17. A method of encoding a video frame comprising:
   initializing a motion estimation routine at a first pixel location within a search space to encode a current video block of the video frame by an encoder;
   defining a circle of a radius R around the first pixel location by the encoder;
   comparing the current video block to video blocks of the search space associated with a set of pixel locations within the circle by the encoder;
   identifying a second pixel location within the circle from the set of pixel locations that identifies a video block yielding a lowest difference value by the encoder; and
   encoding the current video block using a motion vector defined by the identified second pixel location when the identified second pixel location corresponds to a center of the circle by the encoder.

18. The method of claim 17, further comprising the steps of:
   when the identified second pixel location does not correspond to the center of the circle, defining a second circle of a second radius R' around the identified second pixel location;
   identifying a third pixel location within the second circle that identifies a video block yielding a lowest difference value; and
   encoding the current video block using a motion vector defined by the identified third pixel location when the identified third pixel location within the second circle corresponds to a center of the second circle.

19. An apparatus comprising:
   a memory that stores computer executable instructions; and
   a processor that executes the instructions to:
      identify a pixel location associated with a video block in a search space based on calculated motion vectors associated with a set of video blocks within a video frame, the video blocks in the set being located at three or more neighboring locations relative to a current video block of the video frame to be encoded;
      initialize a motion estimation routine for the current video block at the identified pixel locations;
      identify a second pixel location within a circle around the identified pixel location that identifies a video block yielding a lowest difference value; and
      encode the current video block using the motion estimation routine when the second pixel location corresponds to a center of the circle.

20. The apparatus of claim 19, wherein the processor identifies the pixel location by calculating a median based on the motion vectors associated with the video blocks in the set of video blocks located at the three or more neighboring locations relative to the current video block.

21. The apparatus of claim 19, wherein the processor identifies the pixel location by calculating a mean based on pixel coordinates of the video blocks in the set of video blocks located at the three or more neighboring locations relative to the current video block.

22. The apparatus of claim 19, wherein the processor identifies the pixel location by calculating a weighted function based on the motion vectors of the video blocks in the set of video blocks located at the three or more neighboring locations relative to the current video block, wherein those motion vectors associated with corresponding video blocks in the set which are spatially closer to the current video block are given more weight in the weighted function than other motion vectors associated with corresponding video blocks in the set that are spatially further from the current video block.

23. The apparatus of claim 19, wherein the processor executes the instructions to further dynamically adjust a number of computations to be performed based on a determined amount of computational resources available to encode the current video block.

24. An apparatus comprising:
   a memory that stores computer executable instructions; and
   a processor that executes the instructions to:
      initialize a motion estimation routine at a pixel location within a search space to encode a current video block of a video frame;
      define a circle of radius (R) around the pixel location;
      compare the current video block to video blocks of the search space associated with a set of pixel locations within the circle;
      identify a second pixel location within the circle, from the set of pixel locations, that identifies a video block yielding a lowest difference value; and
      encode the current video block using a motion vector defined by the pixel location within the circle that identifies the video block yielding the lowest difference value when the second pixel location corresponds to a center of the circle.

25. An apparatus that encodes video blocks according to an MPEG-4 standard, wherein the apparatus comprises:
   means for identifying a pixel location associated with a video block in a search space based on calculated motion vectors associated with a set of video blocks within a video frame, the set of video blocks being located at three or more neighboring locations relative to a current video block of the video frame to be encoded;
   means for initializing a motion estimation routine for the current video block at the identified pixel location;
   means for identifying a second pixel location within a circle around the identified pixel location that identifies a video block yielding a lowest difference value; and
   means for encoding the current video block using the motion estimation routine when the second pixel location corresponds to a center of the circle.

26. The apparatus of claim 25, further comprising a digital signal processor that executes computer readable instructions to encode the video blocks according to the MPEG-4 standard.

27. An apparatus that encodes video blocks according to an MPEG-4 standard, the apparatus comprising:
means for initializing a motion estimation routine at a pixel location within a search space to encode a current video block of a video frame;
means for defining a circle of a radius R around the pixel location;
means for comparing the current video blocks to video blocks of the search space associated with a set of pixel locations within the circle;
means for identifying a second pixel location within the circle that identifies a video block yielding a lowest difference value; and
means for encoding the current video block using a motion vector defined by the second pixel location when the second pixel location corresponds to a center of the circle.

28. A tangible computer readable medium comprising computer executable instructions stored thereon that, upon execution in a device that encodes video sequences compliant with an MPEG-4 standard cause the device to:
identify a pixel location associated with a video block in a search space based on calculated motion vectors associated with a set of video blocks within a video frame, the video blocks in the set being located at three or more neighboring locations relative to a current video block of the video frame to be encoded;
initialize a motion estimation routine for the current video block at the identified pixel location;
identify a second pixel location within a circle of radius R around the identified pixel location that identifies a video block yielding a lowest difference value; and
encode the current video block using the motion estimation routine when the second pixel location corresponds to a center of the circle.

29. The computer readable medium of claim 28, wherein the video blocks at the three or more neighboring locations relative to the current video block comprise video blocks adjacent to the current video block.

30. The computer readable medium of claim 28, wherein the computer executable instructions upon execution cause the device to identify the pixel location by calculating a set of pixel coordinates based on the motion vectors associated with the video blocks in the set of video blocks located at the three or more neighboring locations relative to the current video block.

31. The computer readable medium of claim 30, wherein the computer executable instructions upon execution cause the device to calculate the set of pixel coordinates by calculating a median based on the motion vectors of the video blocks in the set of video blocks located at the three or more neighboring locations relative to the current video block.

32. The computer readable medium of claim 30, wherein the computer executable instructions upon execution cause the device to calculate the set of pixel coordinates by calculating a mean based on the motion vectors of the video blocks in the set of video blocks located at the three or more neighboring locations relative to the current video block.

33. The computer readable medium of claim 30, wherein the computer executable instructions upon execution cause the device to calculate the set of pixel coordinates by calculating a weighted function based on the motion vectors associated with the video blocks in the set of video blocks located at the three or more neighboring locations relative to the current video block, wherein those motion vectors associated with corresponding video blocks in the set which are spatially closer to the current video block are given more weight in the weighted function than other motion vectors associated with corresponding video blocks in the set that are spatially further from the current video block.

34. The computer readable medium of claim 28, further comprising computer executable instructions that upon execution cause the device to encode the current video block using the motion estimation routine.

35. The computer readable medium of claim 34, wherein the motion estimation routine includes computer executable instructions that upon execution cause the device to dynamically adjust a number of computations to be performed based on a determined amount of computational resources available to encode the current video block.

36. A tangible computer readable medium comprising computer executable instructions stored thereon that, upon execution in a device that encodes video sequences compliant with an MPEG-4 standard cause the device to:
initialize a motion estimation routine at a pixel location within a search space to encode a current video block of a video frame;
define a circle of a radius R around the pixel location;
compare the current video block to video blocks of the search space associated with a set of pixel locations within the circle;
identify a second pixel location within the circle that identifies a video block yielding a lowest difference value; and
encode the current video block using a motion vector defined by the second pixel location within the circle when the second pixel location corresponds to a center of the circle.

37. The computer readable medium of claim 36, wherein when the second pixel location within the second circle does not correspond to the center of the circle, the computer executable instructions, upon execution by the device cause the device to:
define a second circle of a second radius R' around the second pixel location;
identify a third pixel location within the second circle that identifies a video block yielding a lowest difference value; and
encode the current video block using a motion vector defined by the third pixel location when the third pixel location corresponds to a center of the second circle.

38. An apparatus comprising:
means for identifying a pixel location associated with a video block in a search space based on calculated motion vectors associated with a set of video blocks within a video frame, the video blocks in the set being located at three or more neighboring locations relative to a current video block of the video frame to be encoded;
means for initializing a motion estimation routine for the current video block at the identified pixel location;
means for identifying a second pixel location within a circle around the identified pixel location that identifies a video block yielding a lowest difference value; and
means for encoding the current video block using the motion estimation routine when the identified second pixel location corresponds to a center of the circle.

39. An apparatus comprising:
means for initializing a motion estimation routine at an initial pixel location within a search space to encode a current video block of a video frame;

means for defining a circle of a radius around the initial pixel location;

means for comparing the current video blocks to video blocks of the search space associated with a set of pixel locations within the circle;

means for identifying a pixel location within the circle that identifies a video block yielding a lowest difference value; and means for encoding the current video block using a motion vector defined by the identified pixel location when the identified pixel location corresponds to a center of the circle.

40. The device of claim 8, wherein the radius R is approximately equal to the second radius R'.

41. The method of claim 18, wherein the radius R is approximately equal to the second R'.

42. The device of claim 8, wherein the encoder further comprises:

means for defining a third circle of a third radius R" around the third pixel location when the third pixel location within the second circle does not correspond to the center of the second circle;

means for identifying a fourth pixel location within the third circle that identifies a video block yielding a lowest difference value; and means for encoding the current video block using a motion vector defined by the fourth pixel location when the fourth pixel location within the third circle corresponds to a center of the third circle.

43. The method of claim 10, wherein the encoding step further comprises the steps of:

when the identified second pixel location within the circle does not correspond to the center of the circle, defining a second circle around the identified second pixel location;

identifying a third pixel location within the second circle that identifies a video block yielding a lowest difference value; and encoding the current video block using a motion vector defined by the identified third pixel location when the identified third pixel location within the second circle corresponds to a center of the second circle.

44. The method of claim 18, further comprising the steps of:

when the identified third pixel location within the second circle does not correspond to the center of the second circle, defining a third circle of a third radius R" around the identified third pixel location;

identifying a fourth pixel location within the third circle that identifies a video block yielding a lowest difference value; and encoding the current video block using a motion vector defined by the identified fourth pixel location within the third circle when the identified fourth pixel location within the third circle corresponds to a center of the third circle.

45. The apparatus of claim 24, wherein when the second pixel location does not correspond to the center of the circle, the processor further executes instructions to:

define a second circle of a second radius R' around the second pixel location;

identify a third pixel location within the second circle that identifies a video block yielding a lowest difference value; and encode the current video block using a motion vector defined by the third pixel location within the second circle when the third pixel location corresponds to a center of the second circle.

46. The apparatus of claim 27, further comprising a digital signal processor that executes computer readable instructions to encode the video blocks according to the MPEG-4 standard.

47. The computer readable medium of claim 28, wherein the motion estimation routine further includes computer executable instructions that cause the device to:

when the second pixel location within the circle of the radius R does not correspond to the center of the circle, define a second circle of a second radius R' around the second pixel location;

identify a third pixel location within the second circle that identifies a video block yielding a lowest difference value; and encode the current video block using a motion vector defined by the third pixel location when the third pixel location corresponds to a center of the second circle.

48. The computer readable medium of claim 37, wherein the radius R is approximately equal to the second radius R'.

49. The computer readable medium of claim 37, wherein when the third pixel location within the second circle does not correspond to the center of the second circle, the computer executable instructions, upon execution by the device cause the device to:

define a third circle of a third radius R" around the third pixel location;

identify a fourth pixel location within the third circle that identifies a video block yielding a lowest difference value; and encode the current video block using a motion vector defined by the fourth pixel location when the fourth pixel location corresponds to a center of the third circle.

* * * * *